(12) United States Patent
Schneider

(10) Patent No.: US 12,737,790 B2
(45) Date of Patent: Sep. 15, 2026

(54) SELF-CONTAINED, AI-RELATED CARD AND SPORTS CARD GRADING MACHINE

(71) Applicant: Jeruel W. Schneider, Sonora, CA (US)

(72) Inventor: Jeruel W. Schneider, Sonora, CA (US)

( * ) Notice: Subject to any disclaimer, the term of this patent is extended or adjusted under 35 U.S.C. 154(b) by 153 days.

(21) Appl. No.: 18/237,402

(22) Filed: Aug. 23, 2023

(65) Prior Publication Data

US 2024/0119487 A1 Apr. 11, 2024

Related U.S. Application Data

(60) Provisional application No. 63/400,317, filed on Aug. 23, 2022.

(51) Int. Cl.
*G06Q 30/02* (2023.01)
*G09F 1/12* (2006.01)

(52) U.S. Cl.
CPC ........... *G06Q 30/0278* (2013.01); *G09F 1/12* (2013.01)

(58) Field of Classification Search
CPC .... G06Q 30/0278; G09F 1/12; G06K 7/1413; G06K 7/1417; G06K 7/14
USPC .......................... 235/380, 487, 375; 705/306
See application file for complete search history.

(56) References Cited

U.S. PATENT DOCUMENTS

2003/0132132 A1* 7/2003 Small .................. A45C 11/182 206/449
2007/0187266 A1* 8/2007 Porter ..................... B42F 7/025 206/459.5
2022/0036371 A1* 2/2022 Frisbee .................. G06V 10/82
2022/0343483 A1* 10/2022 Desai ........................ G06T 5/90
2022/0417376 A1* 12/2022 Hurst .................... B07C 5/3422
2023/0252532 A1* 8/2023 Isakov ................. G06K 7/1413 705/306

FOREIGN PATENT DOCUMENTS

CA 3180618 A1 * 12/2021 ........... G06V 10/273

* cited by examiner

*Primary Examiner* — Edwyn Labaze
(74) *Attorney, Agent, or Firm* — Hoang Steve Ngo

(57) ABSTRACT

The present invention is a self-contained, AI-related card and sports card grading machine for scanning, grading, and encapsulating cards and sports cards. As a non-limiting embodiment, the machine preferably includes many, most or all of the following components and/or features: a housing, a control panel, a retractable card tray, a slab insert door, a slab exit door, a label insert door, software, a scanning device, a printing device, a card-encapsulation arm(s) or apparatus, a slab/plastic encapsulation/holder compartment, and a card holder. There is also a possibility for an additional subscription based membership for all owners/users of the machine. Being that the card is automatically stored in the online application database, it can then automatically be added to the users' profile/archive. The monthly subscription option would then track all metrics of every card in the users' database of cards, showing market data, recent sales and all performance metrics and data.

27 Claims, 13 Drawing Sheets

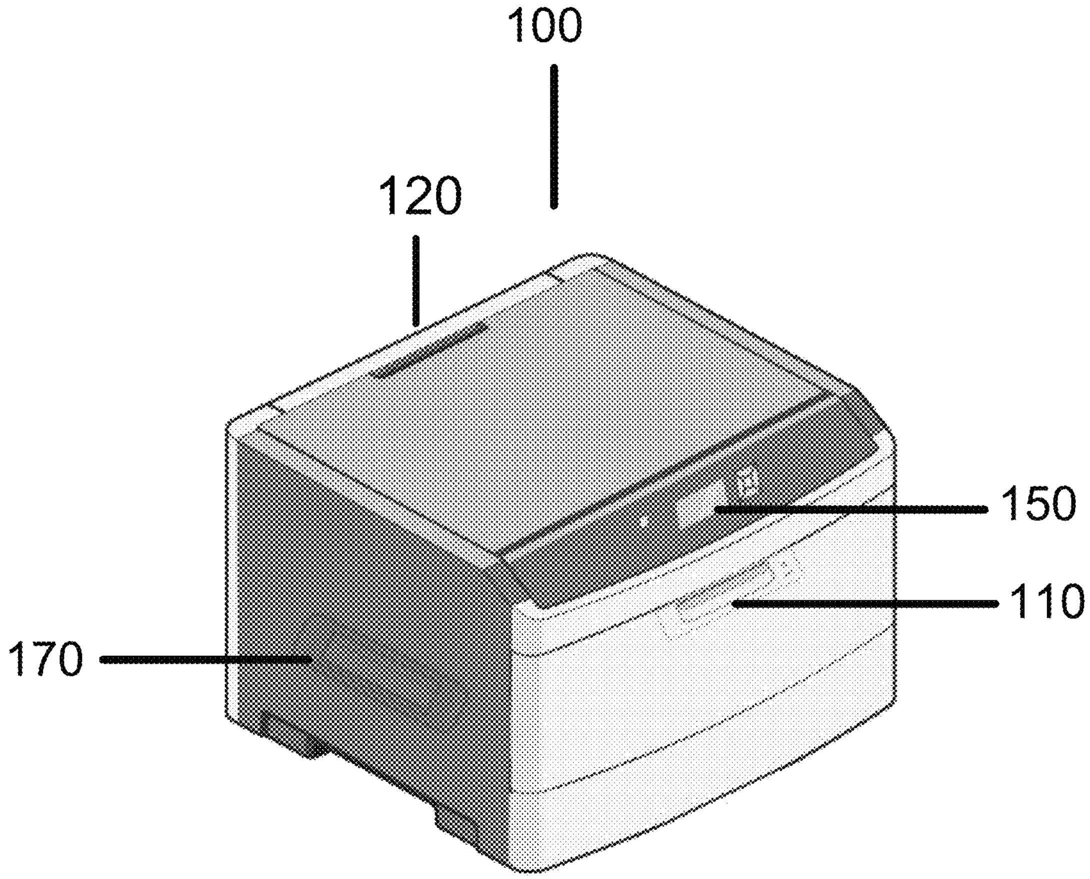
F I G. 1

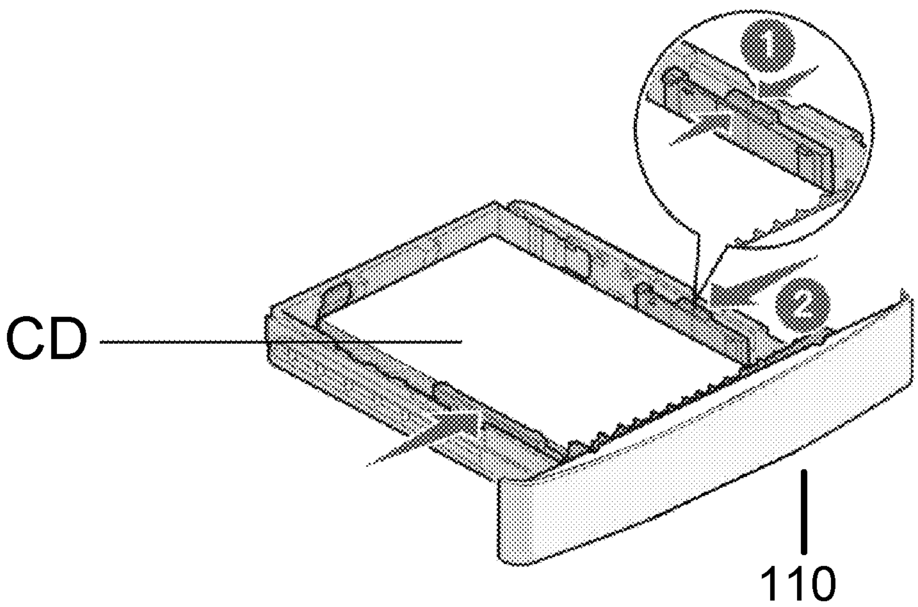
F I G. 3

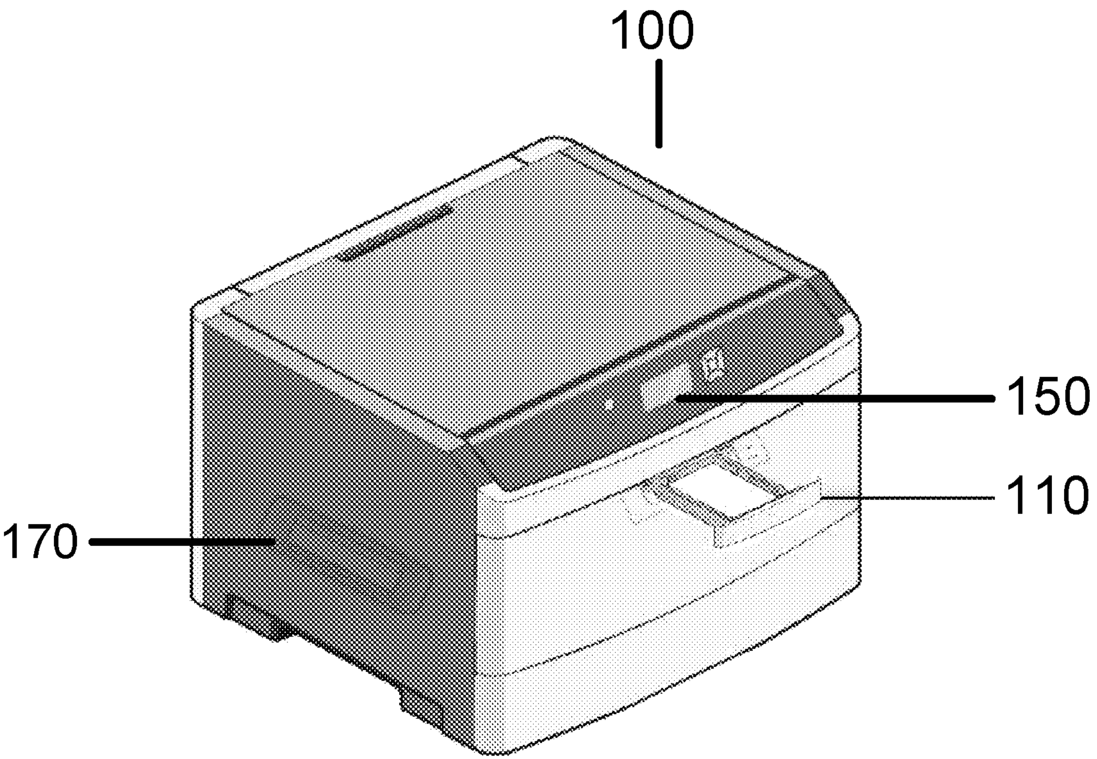
F I G. 5

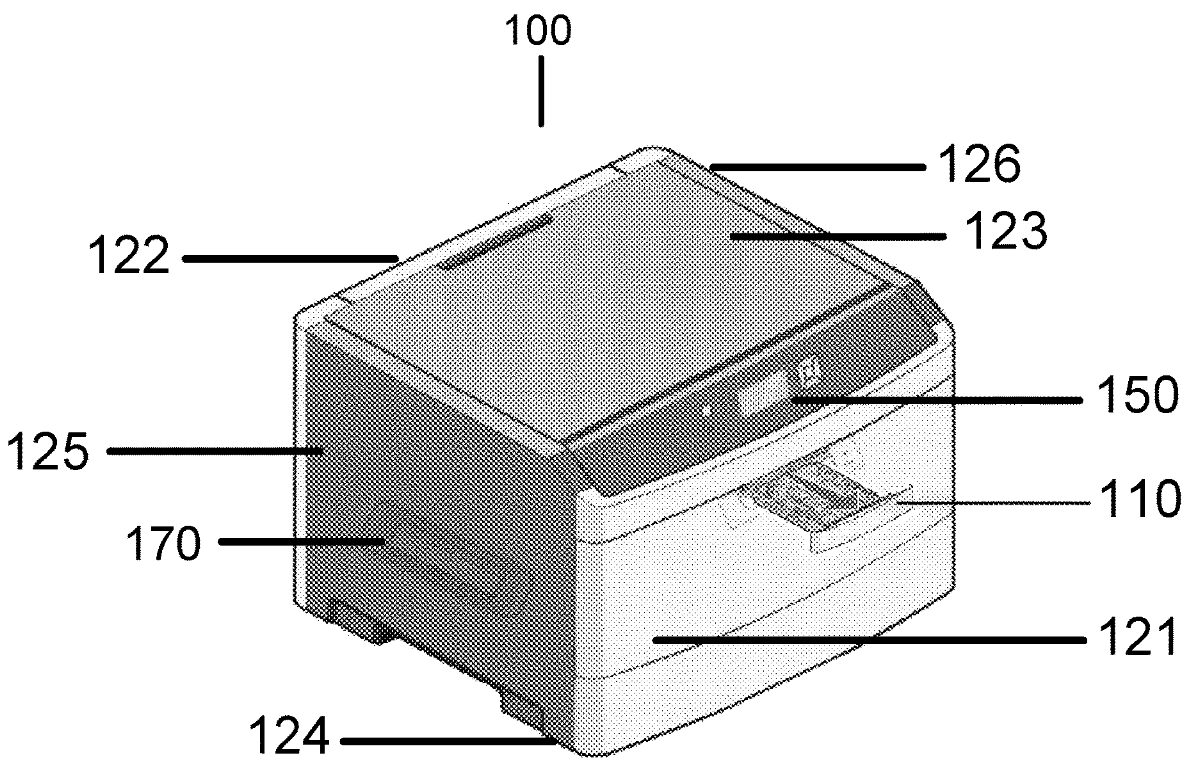
F I G. 6

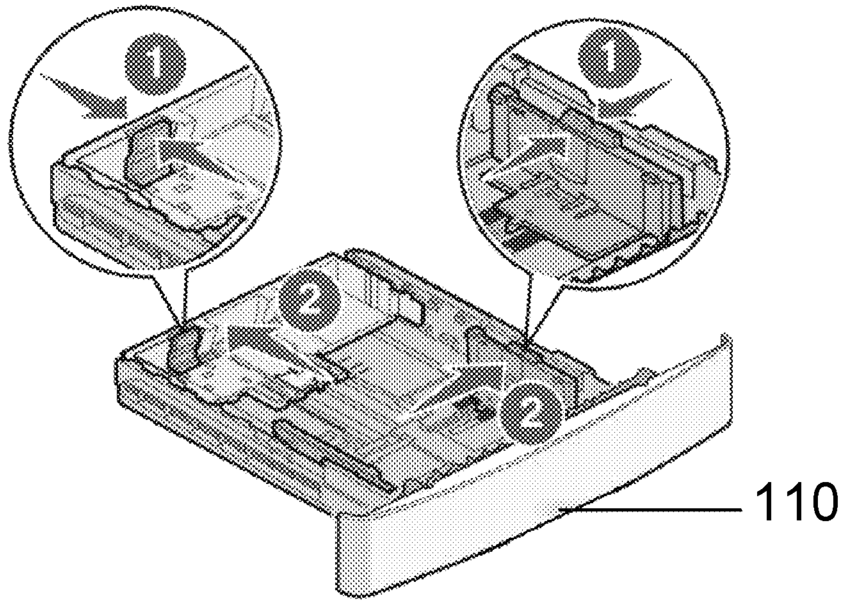
F I G. 7

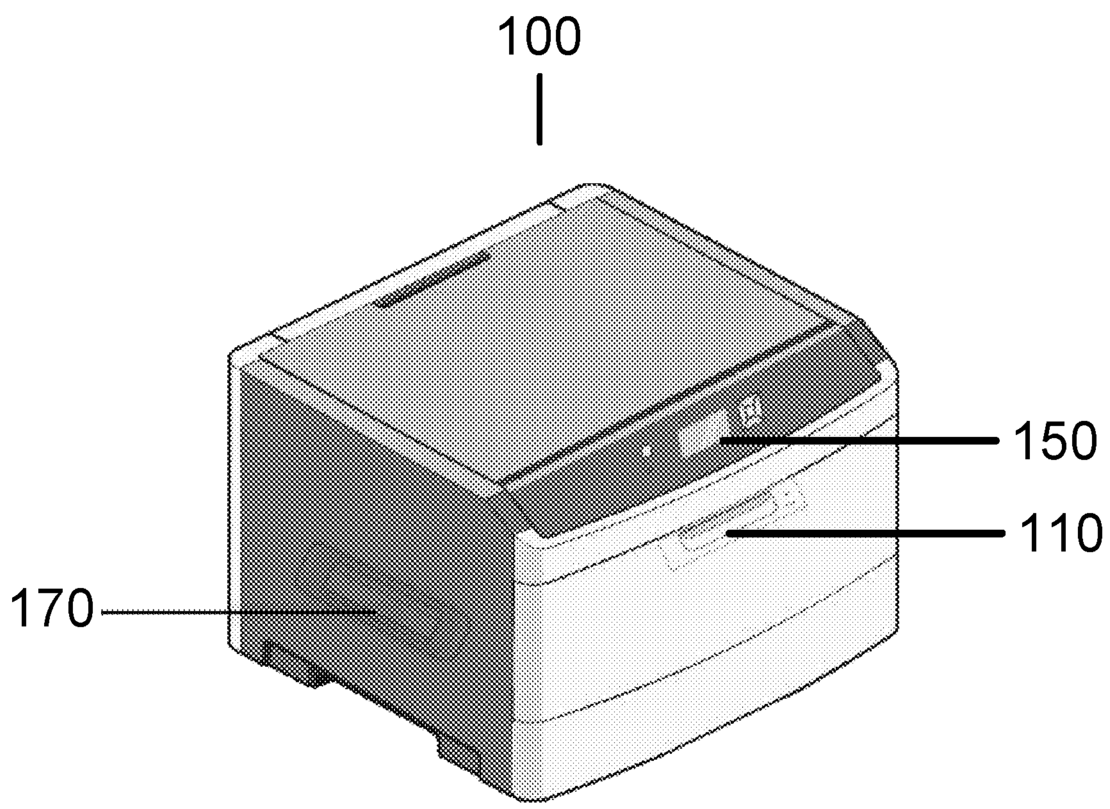
F I G. 9

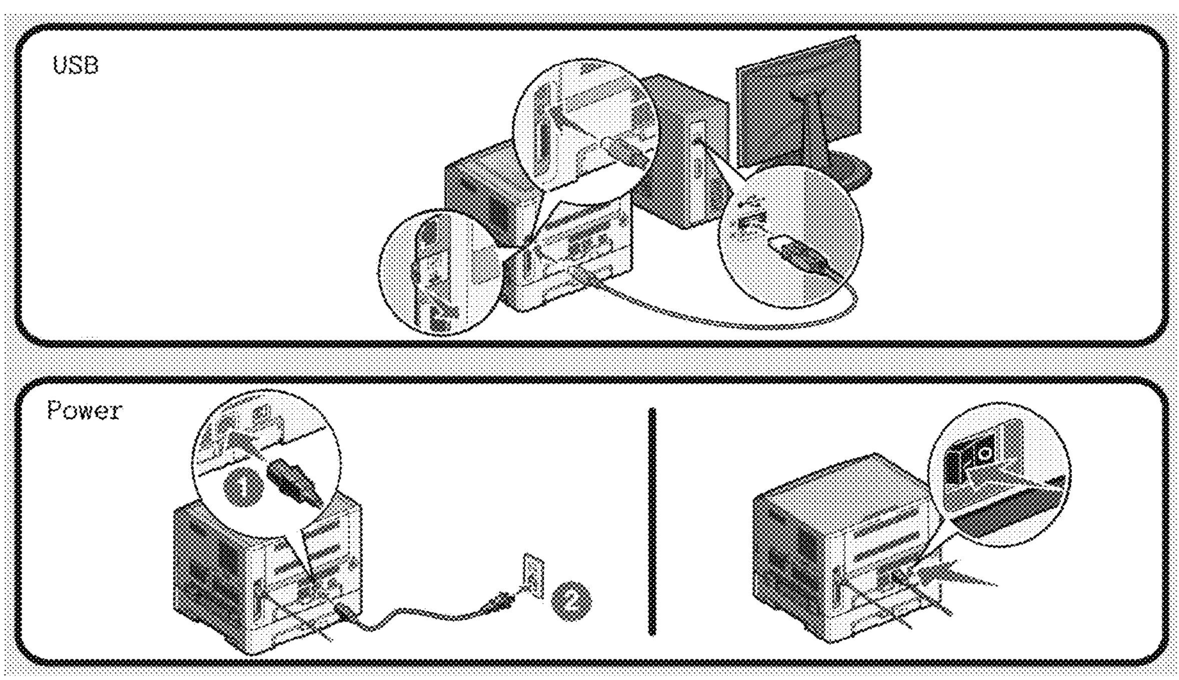
F I G. 10

SELF-CONTAINED, AI-RELATED CARD AND SPORTS CARD GRADING MACHINE

CROSS-REFERENCE TO RELATED APPLICATION

The present application claims the priority benefit of U.S. Provisional Patent Application Ser. No. 63/400,317, filed on Aug. 23, 2022, which is incorporated herein by reference in its entirety.

BACKGROUND OF THE INVENTION

Field of the Invention

The present invention relates generally to card and sports card grading machines, device, and systems. More specifically, the present invention is a self-contained, AI-related card and sports card grading machine for scanning, grading, and encapsulating cards and sports cards.

Description of the Related Art

Card and sports card grading machines, device, and systems are known in the art.

Card grading, particularly sports card grading, is a popular process in which a card is sent to a specific grading company and, based on their methods, a grade normally between 1-10 is assessed. The card is then "slabbed" (encapsulated) in a specifically designed case with the final grade and information being clearly visible and the card is also assigned a certification number of authenticity. This certification of authenticity is added to the database of the grading company.

An example of an encapsulated card, as shown in FIGS. 12-13, shows a standard case, card, year and make of the card, player name, card number, grade, bar code, holographic "PSA" stamp, and serial number. The back also has the holographic stamp, the bar code, QR code, and serial number.

The concept of the present invention is to offer a new alternative in entirely eliminating an outside/third party grading company. The present invention not only provides pure ownership and overall control of the grading process to the card's owner, but is the inevitable step toward efficiency in many ways such as the speed of production and cost effectiveness.

The self-contained, AI-related card and sports card grading machine of the present invention takes a raw ungraded card from A to Z (or start to finish), delivering a fully identified and graded card to its owner and all within a reasonable timeframe. (Optimally under ten minutes, and preferably less than thirty minutes.) In owning this machine, exorbitant fees and waiting times with the card grading companies are non existent, and all human interaction and influence with the card, resulting in mixed and inconsistent results, are non existent.

The present invention overcomes one or more of the shortcomings of other card and sports card grading machines, device, and systems. The Applicant is unaware of inventions or patent documents, taken either singly or in combination, which are seen to describe the present invention as claimed.

An advantage of the self-contained, AI-related card and sports card grading machine of the present invention is that it may be operated or used out of your own home or office and eliminates all necessities of the current card grading market, such as packing the card(s), shipping, paying, waiting and most importantly, relying on the human eye of the grader at the card grading company.

Another advantage of the self-contained, AI-related card and sports card grading machine of the present invention is that it is a single machine that can accomplish the tasks of scanning, grading, and encapsulating cards and sports cards.

A further advantage of the self-contained, AI-related card and sports card grading machine of the present invention is that it takes a raw ungraded card from A to Z (or start to finish), delivering a fully identified and graded card to its owner and all within a reasonable timeframe.

An additional advantage of the present invention is that a subscription-based membership for all owners/users of this self-contained, AI-related card and sports card grading machine may be provided or offered as an add-on.

SUMMARY OF THE INVENTION

The present invention is a self-contained, AI-related card and sports card grading machine (also referred to as "card grading machine") for scanning, grading, and encapsulating cards and sports cards.

As a non-limiting embodiment, this card grading machine preferably comprises many, most or all of the following components and/or features: a housing (or a plurality of sides that forms a housing-like or box-like configuration), a control panel, a retractable card tray, a slab insert door, a slab exit door, a label insert door, software, a scanning device, a printer or printing device, a card-encapsulation arm(s) or apparatus, a slab/plastic encapsulation/holder compartment, and a card holder.

A preferred feature of the present invention is the online internet-based application that will communicate with the card grading machine. This communication is preferably accomplished via USB or bluetooth as the card grading machine will have Wi-fi connectivity capability, similar to a wireless printer. As a non-limiting example of a method or process of the present invention, the various stages and methods that may be included in the present invention are:

1) download online web application;
2) complete user registration within the online web application;
3) link application and card grading machine over Wifi;
4) application and card grading machine are ready for scanning;
5) place card in/on appropriate slot or space within the card grading machine;
6) application will have an auto-detect technology where it will automatically detect what vintage the card is along with the series, player name, etc.;
7) if the application is unable to identify the card, the user must enter required queries to begin next stage of scan;
8) once the application deems the card grading machine is ready for the next stage of scan, it will inform the user;
9) upon next step, the card grading machine begins its AI scanning which will be part of a detailed programmed process as seen in the video (via the link provided in this application) and in the referenced U.S. Pat. No. 10,445,330 B2. (The AI system is preferred to have the capabilities to determine card authenticity, weight, size, corner condition, surface condition, front and back forensics, etc. as seen in the video (via the link provided in this application).) This process of the scanning will be preferably visible to the user in the online application. It will inform the user of each step and the outcome of each step during the entire scanning;

10) upon completion, the card grading machine will end its process and the results will be displayed in its entirety in the online application;

11) once the results is provided or displayed, a key step is preferred: the user now has the option to, in basic terms, "Accept the grade and encapsulate the card" or "Decline the grade and do not encapsulate the card." This is key as it gives the user an option currently unavailable in the entire grading market. One cannot decline a finalized grade from a grading company and there are no offered details of the process such as the online application will offer with the card grading machine;

12) if the user "Accepts" the grade, the card grading machine will then go through its process of "slabbing" (encapsulating) the card and upon completion, will deliver the card out of a specific slot, similar to a printer delivering a piece of printed paper. The card will be automatically added to the system's online database/registry and will correspond with the serial number placed on the information section of the card encapsulation as shown in the Michael Jordan encapsulated card example disclosed in this application. Unique identifiers and tamper-proof security will also be part of the printed tab as we see in the holographic PSA logo in the card example;

13) if the user "Declines" the grade, the card grading machine will not proceed and there will be a simple process in redelivering the card to the user. (such as the card grading machine will release its current hold/scan on the card and will move it back to where the card was originally inserted. The online application would most likely take part in this process and inform the user when it is "ready" or "safe" to open the machine back up and retrieve the card or whatever method may be programmed in doing this.)

As another non-limiting example of a process or method of the present invention comprising the following steps:

1) user will download desktop application from the specified website;

2) user will register free account;

3) user will power on machine;

4) user will pair machine and user's account, preferably, via bluetooth connection or USB/Firewire;

5) once paired, the application (also referred to as "app") will give a 'Scan Card' option;

6) for user to begin scan and grading process, user will select the 'Scan Card' option;

7) the application will then display the necessary disclosures, terms, etc.

8) once all necessary disclosures, terms, etc. have been digitally signed and confirmed within the application, the application will begin to lead the user through the process for scanning/grading the card;

9) the first step the application will display may be: 'Eject tray on the Card Grading Machine by pressing the eject button';

10) the card tray will eject;

11) once complete, user will select 'Next' on the application to proceed to the next step;

12) the next step the application may display with a detailed example will be: 'Following the diagram, place card exactly as seen onto the card tray';

13) once complete, user will select 'Next' on the application to proceed to the next step;

14) if machine has manual centering guides: The next step the application may display with a detailed example will be: 'To ensure centering and placement of card, please adjust the manual guides as seen in the example. The guides contain stops and will not damage the card. Please do not force the guides beyond the stops';

15) if machine has electric centering guides: The next step the application will display with a detailed example will be: 'To ensure centering and placement of card, press the Center button. The guides contain stops and will not damage the card.' These guides will electronically move into place and center the card.

16) once complete, user will select 'Next' on the application to proceed to the next step;

17) the next step the application will display with a detailed example may be: 'Please confirm the card is centered as seen in the example.'

18) the application will then display 'Confirm' or 'Cancel';

19) if the card is not centered, the user will select 'Cancel' and the guides will retract if electric or will need to manually be retracted if manual;

20) once this is complete and the card is realigned by the user, the application will return to Step 17;

21) if 'Confirm' is selected from Step 18, the tray will automatically retract the tray into the machine;

22) the tray will now transfer to the scanning table within the machine;

23) the tray will deliver the card to the scanning table by retracting its tray;

24) the card will now be lying on the scanning table 25) with the tray and all bracing out of the way, the top scanner will move into place;

26) the card can now be simultaneously scanned on the bottom and the top;

27) the application will then display 'Begin Scanning' or 'Cancel'

28) if the user selects 'Cancel,' the application will then display 'Return Card?' or 'Begin Scanning' as it prompted in Step 27;

29) if the 'Return Card' is selected, the machine will return the tray and harmlessly capture the card and redeliver to the user via the retractable card tray ejection from Step 9;

30) if 'Begin Scanning' from Step 27 is selected, the machine will commence in its simultaneous scan of the bottom and top of the card;

31) the application will automatically store all images in .jpg format and will prompt the user to name the folder. The possibility of storing a video of the entire scanning/scan process is a possibility;

32) the application will automatically display all necessary stages and results of the scanner such as its entire analysis of each corner, surface, edges, centering, etc.;

33) once the scanning process is complete, the application will then display 'Scan Complete';

34) the application will then display 'Scoring' or 'Click for Scoring';

35) once the user has clicked 'Scoring' or 'Click for Scoring,' all necessary scoring will be displayed within the application and a final assessed score will be displayed;

36) the application will then display 'Slab Card?' or 'Cancel';

37) if the user selects 'Cancel,' then Steps 28-29 will be activated;

38) if the user selects 'Slab Card?' there may then additional disclosures, terms, etc. requiring another digital signature;

39) once all necessary disclosures, terms, etc. have been digitally signed and confirmed within the application, the application will begin the slabbing process
40) the application will then display please wait during the slabbing process and follow the next prompt;
41) the scanning table and top scanner will retract and the slab from the bottom and the top will move into position;
42) the printer will print all necessary information on the grade label;
43) once complete, the machine will clasp the bottom and top pieces of the slab together with strong pressure;
44) the machine will repeat Step 31 in saving all images to the specified folder once the slab is complete;
45) once slabbing is complete, the machine will transfer and deliver the slab to the specified slot on the machine;
46) the application will then display 'Slab is complete. Please remove slab and gently peel off protective adhesive';
47) at this time, the application will now automatically add the generated certification #and all analysis to its database; the population report and the User's account/database;
48) the user will peel off the adhesive the slab is encased in;
49) the application will then display 'Please confirm that everything looks good.' Yes? No?;
50) if the user selects No, the application will proceed with necessary questions that will be forwarded to the company/programming team;
51) if the user selects Yes, the application will then prompt the user if they want to share to a variety of social media networks that will automatically display (preferably including eBay to begin a listing);
52) if the user selects No, the application will then display 'Thank you' and 'Go to account' where the user can now see the graded card added to their personal database along with all clickable necessary information such as its certification #, it's population report, possible value, etc.;
53) if the user selects one of the social media networks displayed in Step 50, it will open a new window where the user can share images and a detailed analysis of their final grade;
54) the user will then have the option to share to other social networks that are still displayed on the main page and/or proceed by clicking the prompt in Step 52: 'Go to account';
55) as in Step 52, when the user selects 'Go to Account,' they will now see the graded card added to their personal database along with all clickable necessary information such as its certification #, its population report, possible value, etc.; and
56) at this stage, the graded card is complete and the user is back in their account on the application where they can commence with another scan, browse, logout, or simply exit the application.

BRIEF DESCRIPTION OF THE DRAWINGS

FIG. 1 is a perspective, right side view of an embodiment of a self-contained, AI-related card and sports card grading machine according to the present invention;

FIG. 3 is an environmental, perspective view of a retractable card tray of the self-contained, AI-related card and sports card grading machine of FIG. 1, wherein a card is positioned inside the retractable card tray;

FIG. 5 is an environmental, perspective, right side view of the self-contained, AI-related card and sports card grading machine of FIG. 1, wherein a retractable card tray is in an open position and a card is positioned inside the retractable card tray;

FIG. 6 is a perspective, right side view of the self-contained, AI-related card and sports card grading machine of FIG. 1, wherein the retractable card tray is in an open position;

FIG. 7 is a perspective view of the retractable card tray of FIG. 3, showing details of card tray manual adjustment features;

FIG. 9 is a perspective, right side view of the self-contained, AI-related card and sports card grading machine of FIG. 1;

FIG. 10 is a perspective, left side, rear view of an embodiment of a self-contained, AI-related card and sports card grading machine according to the present invention, showing connection devices, cables, and the like being in communication with the card grading machine;

Figure 2:
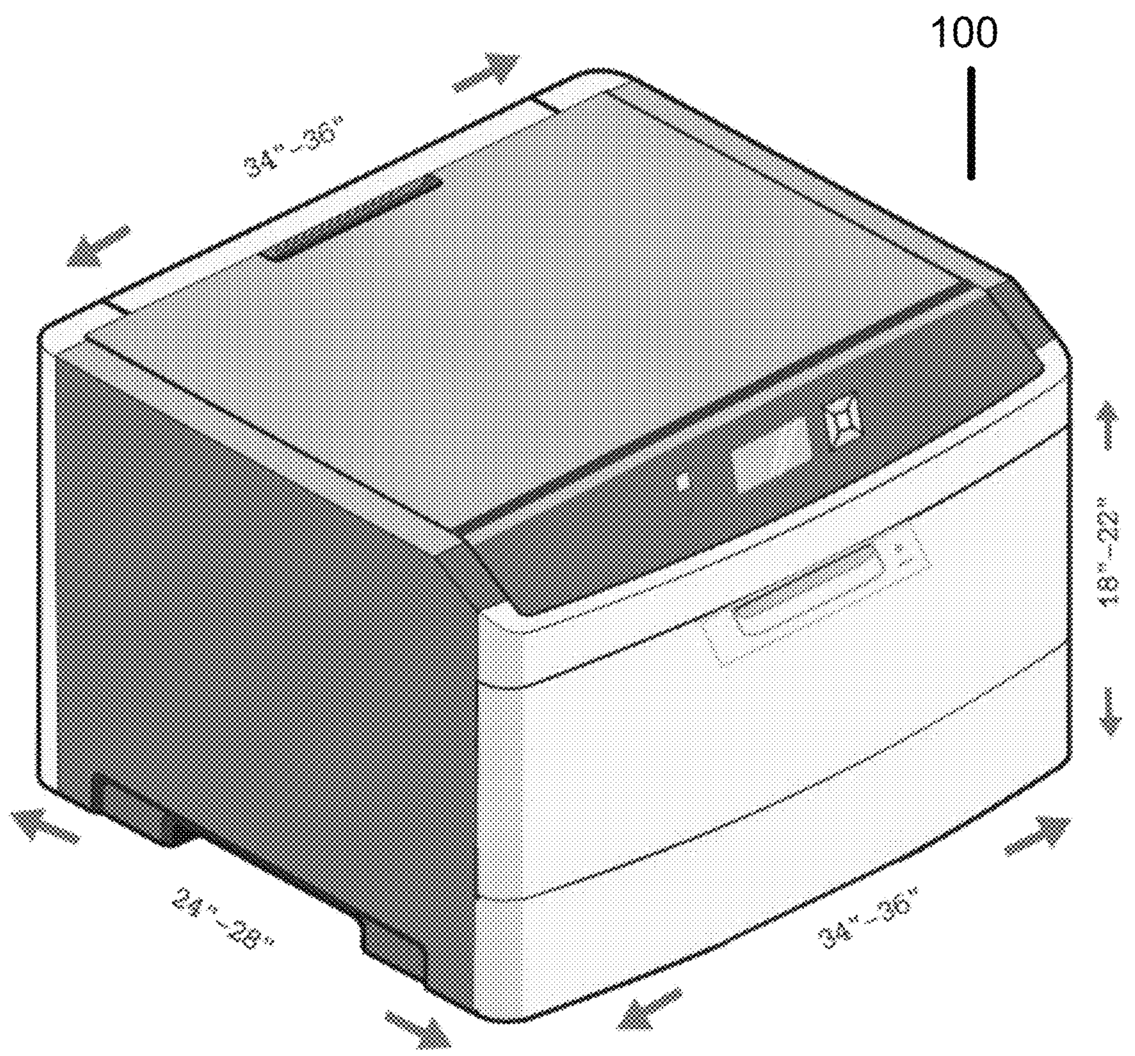
FIG. 2 is a perspective, right side view of another embodiment of a self-contained, AI-related card and sports card grading machine according to the present invention, with non-limiting dimensions.
Figure 4:
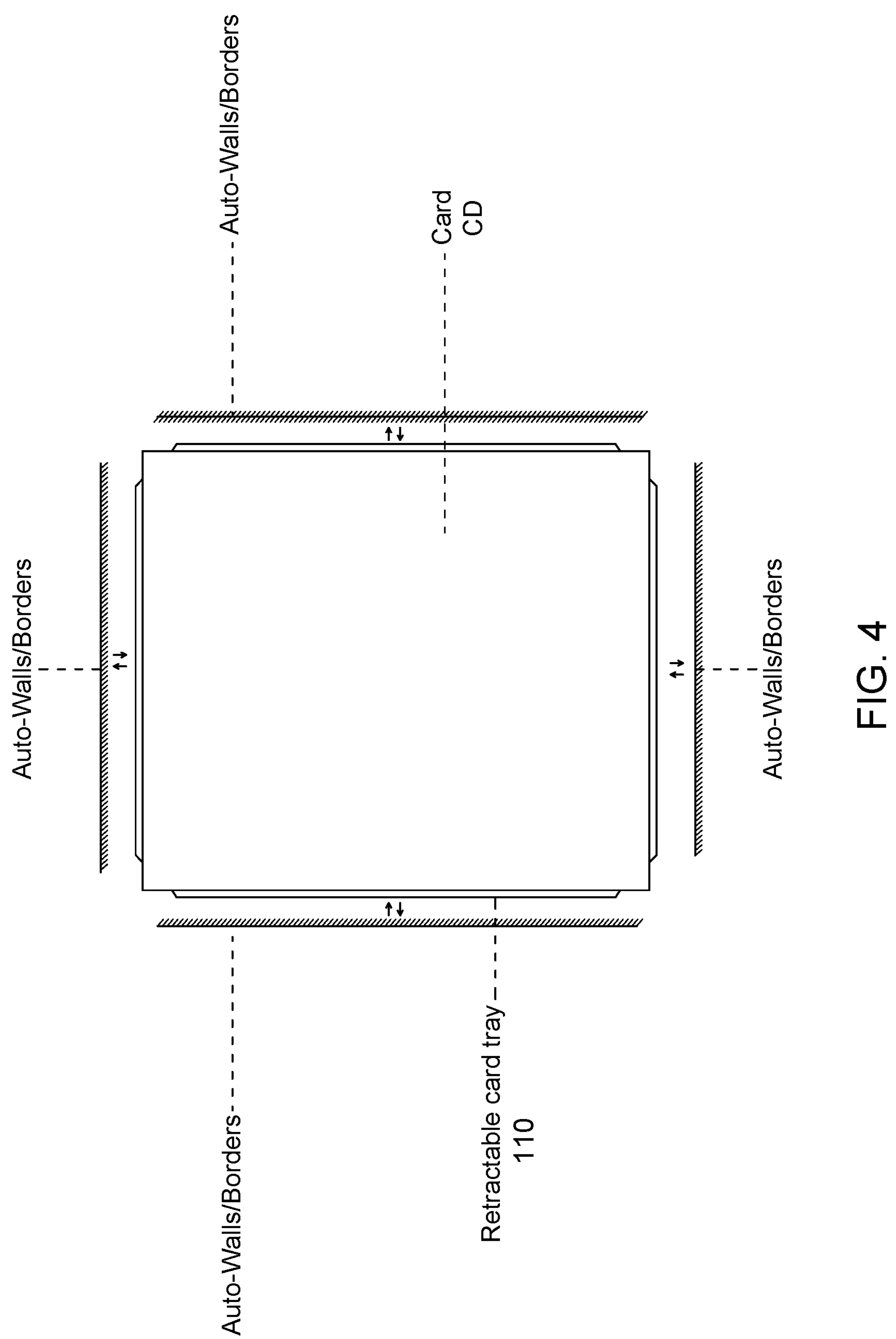
FIG. 4 is an environmental, top view of the retractable card tray of FIG. 3.

It should be understood that the above-attached figures are not intended to limit the scope of the present invention in any way.

DETAILED DESCRIPTION OF THE PREFERRED EMBODIMENTS

Referring to FIGS. 1-11, the present invention is a self-contained, AI-related card and sports card grading machine 100 (also referred to as "card grading machine") for scanning, grading, and encapsulating cards and sports cards.

As a non-limiting embodiment, the card grading machine 100 is preferably a user-friendly home-use or office-use machine that will grade a raw (ungraded) card from beginning to end and deliver a fully identified, certified, databased and graded slabbed (encapsulated, and preferably tamper-proof) card. The card grading machine 100 may be stowed in a similar manner to that of a larger desktop printer and preferably would be similar in size (such as, but not limited to, the dimensions provided in FIG. 2). This card grading machine 100 has an entry point for at least one card (preferably for one card), but other embodiments of the card grading machine of the present invention may have one entry point for multiple cards stacked or compiled on top of one another (so that the user of the card grading machine does not need to wait around to have one card graded at a time) or multiple entry points for multiple cards (so that the user of the card grading machine does not need to wait around to have one card graded at a time). Once inserted or placed, however the design may be finalized, the card grading machine 100 will then go to work with its built in laser technology in scanning the card based on a detailed programmed process. This technology is currently in effect and described in U.S. Pat. No. 10,445,330 B2. Also, a short promotional video from a grading company that is employing this technology for grading cards may be seen via this link: https://www.youtube.com/watch?v=eh3OY9LPQf0

As a non-limiting embodiment and as shown in FIGS. 1-11, the card grading machine 100 preferably comprises many, most or all of the following components and/or features: a housing 120 (with a plurality of sides 121, 122, 123, 124, 125, 126 that forms a housing-like or box-like configuration), a control panel 150, a retractable card tray 110, a slab insert door 160, a slab exit door 170, a label insert door 180, software 190, a scanning device 210, a printer or printing device 220, a card-encapsulation arm(s) or apparatus 230, a slab/plastic encapsulation/holder compartment 240, and a card holder 250. Each of these components or devices can be scaled down or up to any size that allows for the card grading machine 100 to be a self-contained machine (i.e., one single machine) for scanning, grading, and encapsulating cards (such as, but not limited to, collectible cards not involving sports but involving characters, etc.) and sports cards.

The housing 120 preferably comprises plurality of sides: a front side 121, a rear side 122, a top side 123, a bottom side 124, a right side 125, and a left side 126, and preferably contains many or most of the internal devices and components of the card grading machine 100.

The control panel 150 is preferably in communication with software 190 to allow a user, via user input, to provide instructions to the other devices and components, such as, but not limited to, the retractable card tray 110, slab insert door 160, slab exit door 170, and label insert door 180, of the card grading machine 100 to carry out their specific function(s).

Figure 8:
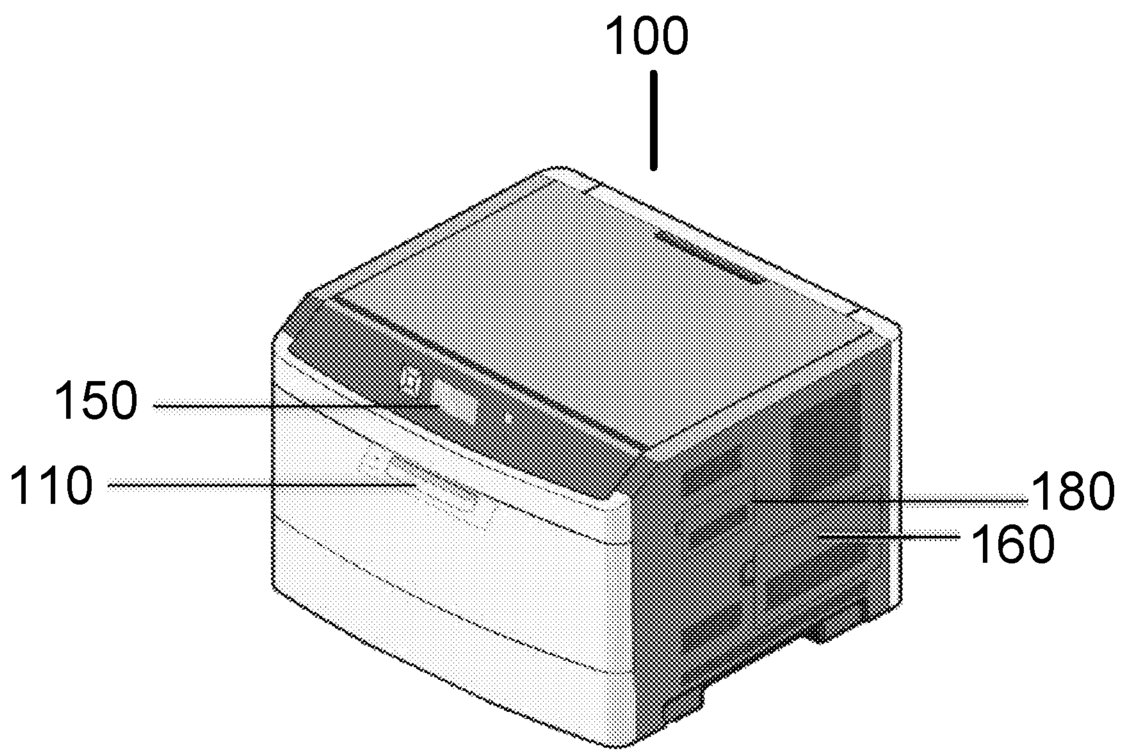
FIG. 8 is a perspective, left side view of the self-contained, AI-related card and sports card grading machine of FIG. 1.
Figure 11:
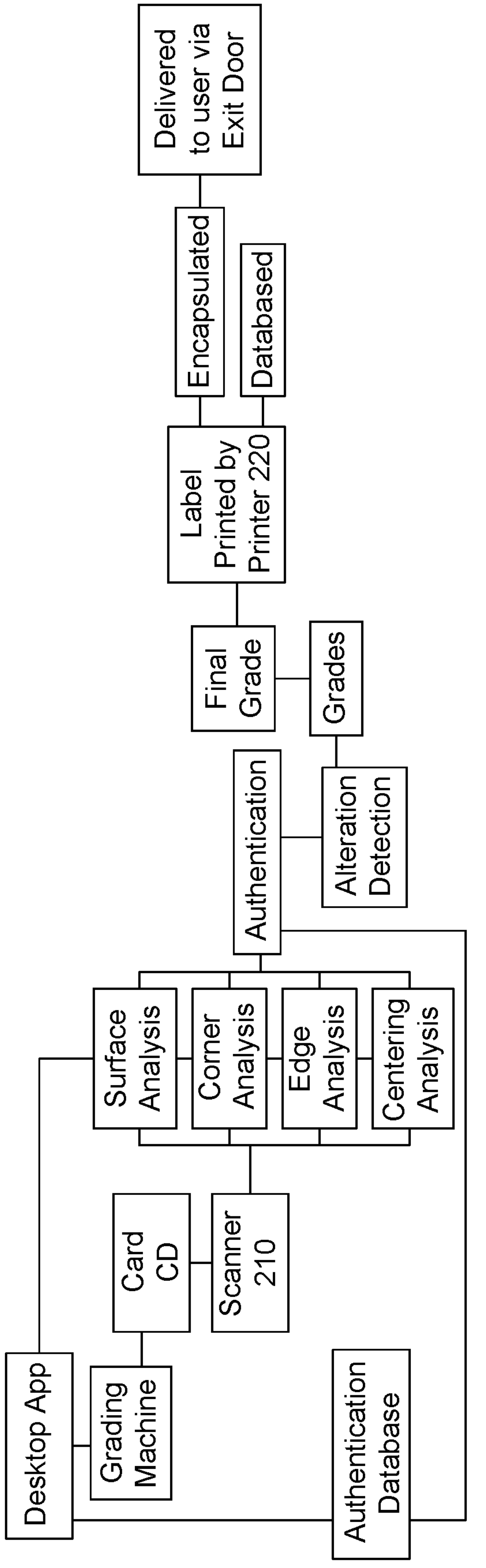
FIG. 11 is a schematic diagram of an embodiment of a self-contained, AI-related card and sports card grading machine according to the present invention.

As best shown in FIGS. 3-8, the retractable card tray 110 is dimensioned and configured to receive at least one card CD, and may be alternatively placed in an open position (such as shown in FIGS. 5 and 6) and a closed position (such as shown in FIG. 8). Preferably, the retractable card tray 110 includes at least one manual adjustment feature so that cards of different sizes can be accommodated. Alternatively, the retractable card tray 110 may be replaced by a non-retractable card tray, a card-receiving area (such as, but not limited to, a glass area that a card may be positioned upon for scanning), or any card-receiving element known to one of ordinary skill in the art.

The slab insert door 160 (or alternatively called card holder insert door) may be alternatively placed in an open position or a closed position, and is the location where the user may insert a slab(s) or card holder(s) into the card grading machine 100 so that the card CD can be slabbed or encapsulated after being graded.

The slab exit door 170 may be alternatively placed in an open position or a closed position, and is the location where the card CD is dispensed from the card grading machine 100 (or where the user may retrieve the card CD) after the card CD is slabbed or encapsulated after being graded.

The label insert door 180 may be alternatively placed in an open position or a closed position, and is the location where the user may insert a label(s) into the card grading machine 100 so that information can be provided on the label(s) and onto the slab or card holder after the card CD is slabbed or encapsulated after being graded.

Preferably, the software 190 is capable of receiving user input and instructions and communicating with many, most or all of the devices and components of the card grading machine 100 and also with a related website or application. Software 190 may be any existing (or non-existing) software program(s), package(s), codes, etc. known to one of ordinary skill in the art in the field of card scanning and grading, in the field of printers, and in any other related field(s) involving electronic devices that can carry out the desired functions.

The scanning device 210 scans the card CD once the card CD is positioned inside or on the retractable card tray 110 and is activated for scanning. As a non-limiting example, the scanning device 210 may be a glass scanning bed or scanning device 210 with automatic top and bottom card analysis, size and dimensions detection. (Negating a card holder or tray to drop card on or in—which may lead to damage upon placement. Also negates the need to flip the card over for scanning the opposite side; ultimately equating to a touch-less grading system.) This also allows for the AI to analyze and grade all sizes of cards as there are many different sizes. A plastic tray or something similar would likely require manual adjustments which defeats the touchless purpose and also allows for risk of damaging the card. The scanning device 210 may be any scanning device known to one of ordinary skill in the art in the field of card scanning and grading, in the field of printers, and in any other related field(s) involving electronic devices that can carry out the desired function(s).

Figure 12:
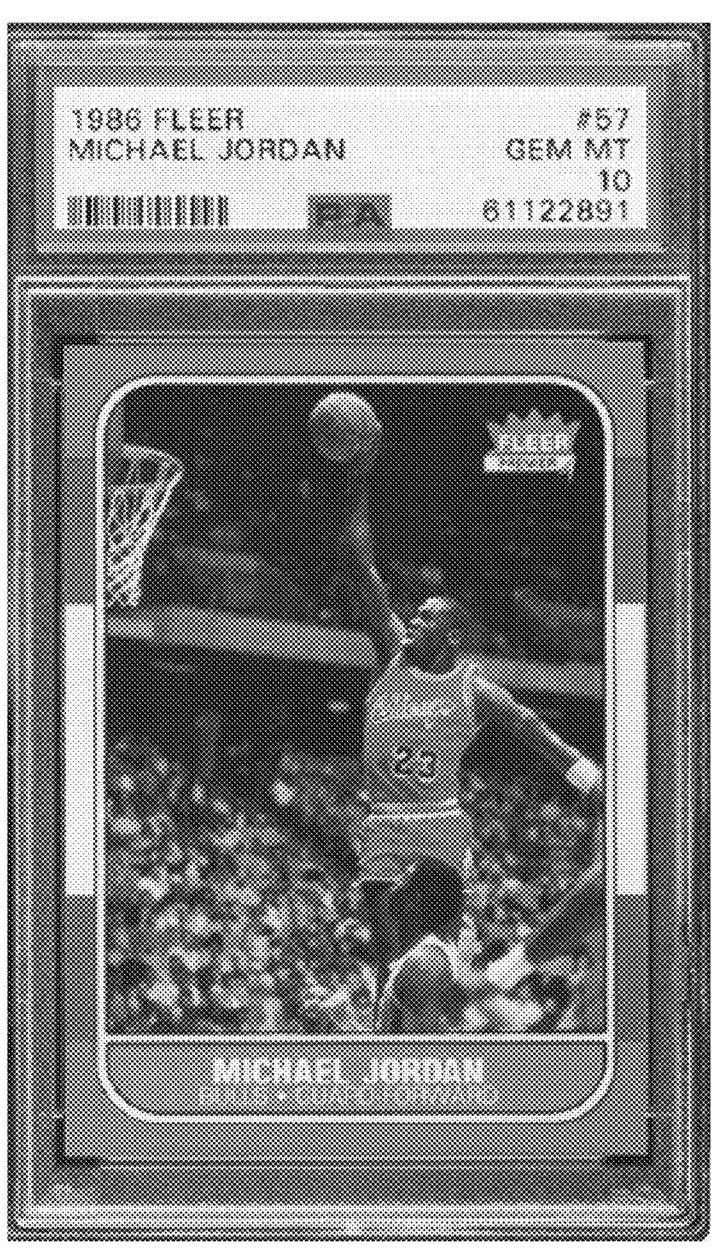
FIG. 12 is a front view of a non-limiting example of an encapsulated sports card.
Figure 13:
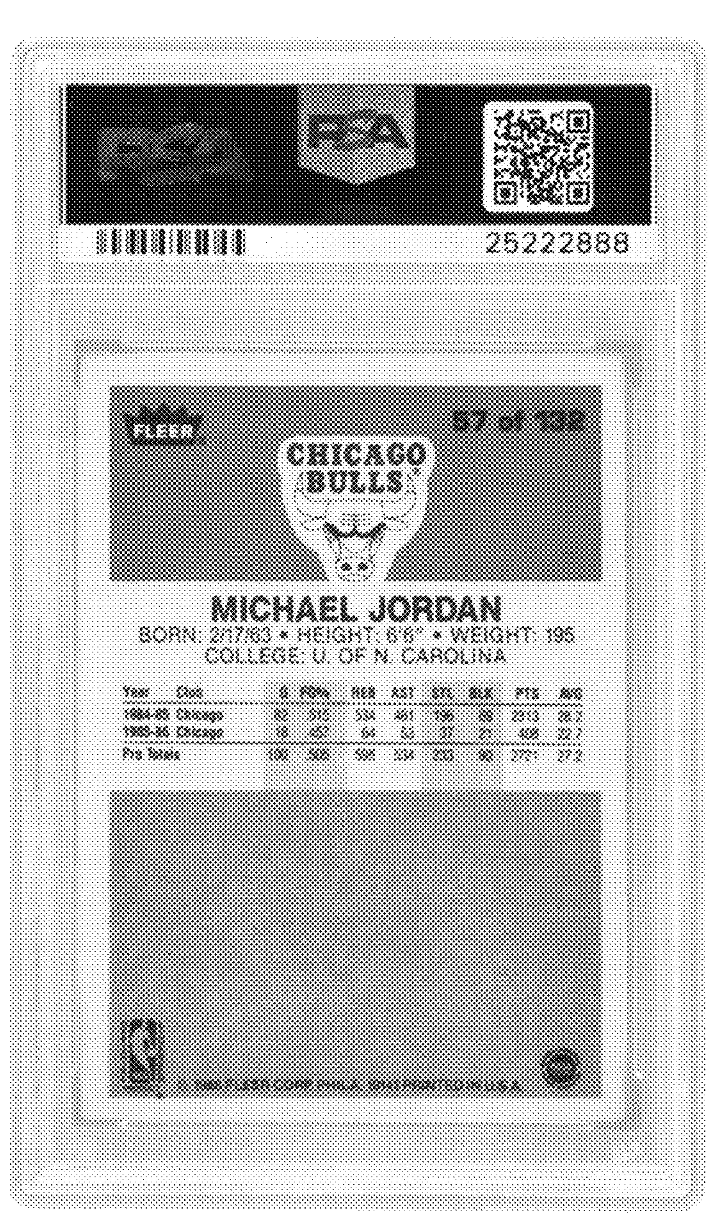
FIG. 13 is a rear view of the encapsulated sports card of FIG. 12.

The printer or printing device 220 has printing capabilities in order to print the label that is also horizontally at the top of the encapsulated card. (As seen in the graded Michael Jordan card shown in FIGS. 12-13). The printer or printing device 220 may be any printing device known to one of ordinary skill in the art in the field of card scanning and grading, in the field of printers, and in any other related field(s) involving electronic devices that can carry out the desired function(s).

The card-encapsulation arm(s) or apparatus 230, upon confirming card encapsulation, preferably harmlessly and with the most extreme precision, perfectly align the card in preparation for encapsulation. (It's nearly impossible for any human to manually lay a card down to a perfect degree, thus, this is a critical component in that it will ensure the card is slabbed/encapsulated perfectly every time). The card-encapsulation arm(s) or apparatus 230 may be any device known to one of ordinary skill in the art in the field of card scanning and grading, in the field of printers, and in any other related field(s) involving electronic devices that can carry out the desired function(s).

The slab/plastic encapsulation/holder compartment 240 preferably holds a pack or group of at least ten holders that automatically feed when the card is ready for encapsulation. (Negating the need to put a slab/encapsulation into the card grading machine 100 every time a card is graded). The slab/plastic encapsulation/holder compartment 240 may be any device known to one of ordinary skill in the art in the field of card scanning and grading, in the field of printers, and in any other related field(s) involving electronic devices that can carry out the desired function(s).

Similar to the slab/encapsulation holder compartment 240, a card holder 250 preferably holds up to ten cards, and may also be designed and/or employed in the card grading machine 100. This would allow the owner or user to input/insert these ten cards and proceed in the same manner stated above. (All cards would be graded individually but this would be a bulk route vs inputting/inserting one card at a a time). The card holder 250 may be any device known to one of ordinary skill in the art in the field of card scanning and grading, in the field of printers, and in any other related field(s) involving electronic devices that can carry out the desired function(s).

A preferred feature of the present invention is the online Internet-based application that will communicate with the card grading machine 100. This communication is via USB or bluetooth as the card grading machine 100 will have Wifi connectivity capability, similar to a wireless printer. As a non-limiting example of a method or process of the present invention, the various stages and methods that may be included in the present invention are:

1) download online web application/app;
2) complete user registration within the online web application;
3) link application and card grading machine 100 over Wifi;
4) application and card grading machine 100 are ready for scanning;
5) place card in/on appropriate slot or space within the card grading machine 100;
6) application will have an auto-detect technology where it will automatically detect what vintage the card is along with the series, player name, etc.;
7) if the application is unable to identify the card, the user must enter required queries to begin next stage of scan;
8) once the application deems the card grading machine 100 is ready for the next stage of scan, it will inform the user;
9) upon next step, the card grading machine 100 begins its AI scanning which will be part of a detailed programmed process as seen in the video (via the link provided in this application) and in the referenced U.S. Pat. No. 10,445,330 B2. (The AI system is preferred to have the capabilities to determine card authenticity, weight, size, corner condition, surface condition, front and back forensics, etc. as seen in the video.) This process of the scanning will be preferably visible to the user in the online application. It will inform the user of each step and the outcome of each step during the entire scanning;
10) upon completion, the card grading machine 100 will end its process and the results will be displayed in its entirety in the online application;
11) this is a preferred key step: the user now has the option to, in basic terms, "Accept the grade and encapsulate the card" or "Decline the grade and do not encapsulate the card." This is key as it gives the user an option currently unavailable in the entire grading market. One cannot decline a finalized grade from a grading company and there are no offered details of the process such as the online application will offer with the card grading machine 100;
12) If the user "Accepts" the grade, the machine will then go through its process of "slabbing" (encapsulating) the card and upon completion, will deliver the card out of a specific slot, similar to a printer delivering a piece of printed paper. The card will be automatically added to the system's online database/registry and will correspond with the serial number placed on the information section of the card encapsulation as seen in the Michael Jordan encapsulated card example shown in FIGS. 12-13. Unique identifiers and tamper-proof security will also be part of the printed tab as we see in the holographic PSA logo in the card example;
13) if the user "Declines" the grade, the card grading machine 100 will not proceed and there will be a simple process in redelivering the card to the user. (such as the card grading machine 100 will release its current hold/scan on the card and will move it back to where the card was originally inserted. The online application would most likely take part in this process and inform the user when it is "ready" or "safe" to open the machine back up and retrieve the card or whatever method may be programmed in doing this.)

As another non-limiting example of a process or method of the present invention comprising the following steps:

1) user will download desktop application from the specified website;
2) user will register free account;
3) user will power on machine;
4) user will pair machine and user's account, preferably, via bluetooth connection or USB/Firewire;
5) once paired, the application (also referred to as "app") will give a 'Scan Card' option;
6) for user to begin scan and grading process, user will select the 'Scan Card' option;
7) the application will then display the necessary disclosures, terms, etc.
8) once all necessary disclosures, terms, etc. have been digitally signed and confirmed within the application, the application will begin to lead the user through the process for scanning/grading the card;
9) the first step the application will display may be: 'Eject tray on the Card Grading Machine by pressing the eject button';
10) the card tray will eject;
11) once complete, user will select 'Next' on the application to proceed to the next step;
12) the next step the application may display with a detailed example will be: 'Following the diagram, place card exactly as seen onto the card tray';
13) once complete, user will select 'Next' on the application to proceed to the next step;
14) if machine has manual centering guides: The next step the application may display with a detailed example will be: 'To ensure centering and placement of card, please adjust the manual guides as seen in the example. The guides contain stops and will not damage the card. Please do not force the guides beyond the stops';
15) if machine has electric centering guides: The next step the application will display with a detailed example will be: 'To ensure centering and placement of card, press the Center button. The guides contain stops and will not damage the card.' These guides will electronically move into place and center the card.
16) once complete, user will select 'Next' on the application to proceed to the next step;
17) the next step the application will display with a detailed example may be: 'Please confirm the card is centered as seen in the example.'
18) the application will then display 'Confirm' or 'Cancel';
19) if the card is not centered, the user will select 'Cancel' and the guides will retract if electric or will need to manually be retracted if manual;
20) once this is complete and the card is realigned by the user, the application will return to Step 17; 21) if 'Confirm' is selected from Step 18, the tray will automatically retract the tray into the machine;
22) the tray will now transfer to the scanning table within the machine;
23) the tray will deliver the card to the scanning table by retracting its tray;
24) the card will now be lying on the scanning table 25) with the tray and all bracing out of the way, the top scanner will move into place;

26) the card can now be simultaneously scanned on the bottom and the top;

27) the application will then display 'Begin Scanning' or 'Cancel'

28) if the user selects 'Cancel,' the application will then display 'Return Card?' or 'Begin Scanning' as it prompted in Step 27;

29) if the 'Return Card' is selected, the machine will return the tray and harmlessly capture the card and redeliver to the user via the retractable card tray ejection from Step 9;

30) if 'Begin Scanning' from Step 27 is selected, the machine will commence in its simultaneous scan of the bottom and top of the card;

31) the application will automatically store all images in .jpg format and will prompt the user to name the folder. The possibility of storing a video of the entire scanning/scan process is a possibility;

32) the application will automatically display all necessary stages and results of the scanner such as its entire analysis of each corner, surface, edges, centering, etc.;

33) once the scanning process is complete, the application will then display 'Scan Complete';

34) the application will then display 'Scoring' or 'Click for Scoring';

35) once the user has clicked 'Scoring' or 'Click for Scoring,' all necessary scoring will be displayed within the application and a final assessed score will be displayed;

36) the application will then display 'Slab Card?' or 'Cancel';

37) if the user selects 'Cancel,' then Steps 28-29 will be activated;

38) if the user selects 'Slab Card?' there may then additional disclosures, terms, etc. requiring another digital signature;

39) once all necessary disclosures, terms, etc. have been digitally signed and confirmed within the application, the application will begin the slabbing process 40) the application will then display please wait during the slabbing process and follow the next prompt;

41) the scanning table and top scanner will retract and the slab from the bottom and the top will move into position;

42) the printer will print all necessary information on the grade label;

43) once complete, the machine will clasp the bottom and top pieces of the slab together with strong pressure;

44) the machine will repeat Step 31 in saving all images to the specified folder once the slab is complete;

45) once slabbing is complete, the machine will transfer and deliver the slab to the specified slot on the machine;

46) the application will then display 'Slab is complete. Please remove slab and gently peel off protective adhesive';

47) at this time, the application will now automatically add the generated certification #and all analysis to its database; the population report and the user's account/database;

48) the user will peel off the adhesive the slab is encased in;

49) the application will then display 'Please confirm that everything looks good.' Yes? No?;

50) if the user selects No, the application will proceed with necessary questions that will be forwarded to the company/programming team;

51) if the user selects Yes, the application will then prompt the user if they want to share to a variety of social media networks that will automatically display (preferably including eBay to begin a listing);

52) if the user selects No, the application will then display 'Thank you' and 'Go to account' where the user can now see the graded card added to their personal database along with all clickable necessary information such as its certification #, it's population report, possible value, etc.;

53) if the user selects one of the social media networks displayed in Step 50, it will open a new window where the user can share images and a detailed analysis of their final grade;

54) the user will then have the option to share to other social networks that are still displayed on the main page and/or proceed by clicking the prompt in Step 52: 'Go to account';

55) as in Step 52, when the user selects 'Go to Account,' they will now see the graded card added to their personal database along with all clickable necessary information such as its certification #, its population report, possible value, etc.; and 56) at this stage, the graded card is complete and the user is back in their account on the application where they can commence with another scan, browse, logout, or simply exit the application.

Preferably, the company that of course is distributing the card grading machine 100 will also sell the proprietary slabs/encapsulations along with offering refillable ink for the printing component.

Preferably, there is also a possibility for an additional subscription based membership for all owners/users of the card grading machine 100. Being that the card is automatically stored in the online application database, it can then automatically be added to the users' profile/archive. The monthly subscription option would then track all metrics of every card in the users' database of cards, showing market data, recent sales and all performance metrics and data. This of course could lead into many other avenues of today's social networking such as sharing/showing the users' database, sharing/showing grades, etc., and may also have the ability to market and/or list specific cards directly to common online marketplaces such as eBay, facebook marketplace, etc.

It is to be understood that the present invention is not limited to the embodiments described above or as shown in the attached figures, but encompasses any and all embodiments within the spirit of the invention.

The invention claimed is:

1. A self-contained, AI-related card and sports card grading machine comprising: a housing comprising a plurality of sides defining a housing chamber; AI-related software capable of receiving user input and communicating with components of said grading machine for scanning and grading at least one card from a user via AI technology; a card-receiving element dimensioned and configured for receiving the at least one card for scanning, wherein said card-receiving element is secured within said housing chamber; and a scanner for scanning the at least one card simultaneously on bottom and top of the at least one card, wherein said scanner is secured within said housing chamber.

2. The self-contained, AI-related card and sports card grading machine of claim 1, wherein said card-receiving element is a retractable card tray that is adapted for being alternatively placed in an open position and a closed position.

3. The self-contained, AI-related card and sports card grading machine of claim 2, wherein said retractable card tray includes at least one manual adjustment feature so that cards of different sizes can be accommodated within said retractable card tray.

4. The self-contained, AI-related card and sports card grading machine of claim 1, further comprising a control panel in communication with said AI-related software.

5. The self-contained, AI-related card and sports card grading machine of claim 1, wherein all of said components of said grading machine other than said housing is positioned within said housing chamber.

6. The self-contained, AI-related card and sports card grading machine of claim 1, further comprising: a card-encapsulating container receiving device dimensioned and configured for receiving at least one card-encapsulating container that is dimensioned and configured for receiving and encapsulating the at least one card, wherein said AI-related software is also capable of receiving user input and communicating with components of said grading machine for encapsulating, and wherein said card-encapsulating container receiving device encapsulates the at least one card within the at least one card-encapsulating container; a label-receiving device dimensioned and configured for receiving at least one label, wherein said label-receiving device affixes the at least one label with printing card grading information to the at least one card-encapsulating container after scanning, grading, and encapsulating; and a printer for printing card grading information on the at least one label, wherein said printer is secured within said housing chamber.

7. The self-contained, AI-related card and sports card grading machine of claim 6, wherein said card-encapsulating container receiving device also functions as a card-encapsulating container exiting device, and wherein said AI-related software is also capable of receiving user input and communicating with components of said grading machine for encapsulating.

8. The self-contained, AI-related card and sports card grading machine of claim 6, wherein said card-encapsulating container receiving device is a slab insert door, and wherein said AI-related software is also capable of receiving user input and communicating with components of said grading machine for encapsulating.

9. The self-contained, AI-related card and sports card grading machine of claim 6, wherein said label-receiving device is a label insert door.

10. The self-contained, AI-related card and sports card grading machine of claim 6, further comprising a card-encapsulating container exiting device.

11. The self-contained, AI-related card and sports card grading machine of claim 6, further comprising a card-encapsulation arm or apparatus for aligning the at least one card in preparation for encapsulation.

12. The self-contained, AI-related card and sports card grading machine of claim 6, further comprising a subscription-based membership, wherein said software is also capable of receiving user input and instructions and communicating with a related website or application.

13. The self-contained, AI-related card and sports card grading machine of claim 6, wherein all of said components of said grading machine other than said housing is positioned within said housing chamber.

14. The self-contained, AI-related card and sports card grading machine of claim 6, further comprising a control panel in communication with said AI-related software.

15. The self-contained, AI-related card and sports card grading machine of claim 6, further comprising a card-encapsulation arm or apparatus for aligning the at least one card in preparation for encapsulation.

16. A self-contained, AI-related card and sports card grading machine comprising: a housing comprising a plurality of sides defining a housing chamber; AI-related software capable of receiving user input and communicating with components of said grading machine for scanning, grading, and encapsulating at least one card from a user via AI technology; a control panel in communication with said AI-related software; a card-receiving element dimensioned and configured for receiving the at least one card for scanning, wherein said card-receiving element is secured within said housing chamber; a scanner for scanning the at least one card simultaneously on bottom and top of the at least one card, wherein said scanner is secured within said housing chamber; a card-encapsulating container receiving device dimensioned and configured for receiving at least one card-encapsulating container that is dimensioned and configured for receiving and encapsulating the at least one card, wherein said card-encapsulating container receiving device encapsulates the at least one card within the at least one card-encapsulating container, and wherein said card-encapsulating container receiving device is secured within said housing chamber; a label-receiving device dimensioned and configured for receiving at least one label, wherein said label-receiving device affixes the at least one label with printing card grading information to the at least one card-encapsulating container after scanning, grading, and encapsulating; and a printer for printing card grading information on the at least one label, wherein said printer is secured within said housing chamber.

17. The self-contained, AI-related card and sports card grading machine of claim 16, wherein said card-receiving element is a retractable card tray that is adapted for being alternatively placed in an open position and a closed position.

18. The self-contained, AI-related card and sports card grading machine of claim 17, wherein said retractable card tray includes at least one manual adjustment feature so that cards of different sizes can be accommodated within said retractable card tray.

19. The self-contained, AI-related card and sports card grading machine of claim 16, wherein said card-encapsulating container receiving device also functions as a card-encapsulating container exiting device.

20. The self-contained, AI-related card and sports card grading machine of claim 16, wherein said card-encapsulating container receiving device is a slab insert door.

21. The self-contained, AI-related card and sports card grading machine of claim 16, wherein said label-receiving device is a label insert door.

22. The self-contained, AI-related card and sports card grading machine of claim 16, further comprising a card-encapsulating container exiting device.

23. The self-contained, AI-related card and sports card grading machine of claim 16, further comprising a subscription-based membership, wherein said software is also capable of receiving user input and instructions and communicating with a related website or application.

24. A self-contained, AI-related card and sports card grading machine comprising: a housing comprising a plurality of sides defining a housing chamber; AI-related software capable of receiving user input and communicating with components of said grading machine for scanning, grading, and encapsulating at least one card from a user via AI technology; a card-receiving element dimensioned and configured for receiving the at least one card for scanning, wherein said card-receiving element is secured within said housing chamber; a scanner for scanning the at least one card simultaneously on bottom and top of the at least one card, wherein said scanner is secured within said housing chamber; a slab insert door dimensioned and configured for receiving at least one card-encapsulating container that is dimensioned and configured for receiving and encapsulating the at least one card; a label insert door dimensioned and configured for receiving at least one label; and a slab exit door dimensioned and configured for allowing the at least one card-encapsulating container to be positioned for exit after scanning and grading; and a printer for printing card grading information on the at least one label, wherein said printer is secured within said housing chamber.

25. The self-contained, AI-related card and sports card grading machine of claim 24, wherein said card receiving device is a retractable card tray that is adapted for being alternatively placed in an open position and a closed position.

26. The self-contained, AI-related card and sports card grading machine of claim 25, wherein said retractable card tray includes at least one manual adjustment feature so that cards of different sizes can be accommodated within said retractable card tray.

27. The self-contained, AI-related card and sports card grading machine of claim 24, further comprising a subscription-based membership, wherein said software is also capable of receiving user input and instructions and communicating with a related website or application.

* * * * *